US010453612B2

United States Patent
Terashita et al.

(10) Patent No.: US 10,453,612 B2
(45) Date of Patent: Oct. 22, 2019

(54) MULTILAYER CERAMIC CAPACITOR

(71) Applicant: Murata Manufacturing Co., Ltd., Nagaokakyo-shi, Kyoto-fu (JP)

(72) Inventors: Yosuke Terashita, Nagaokakyo (JP); Hidetaka Sugiyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/846,369

(22) Filed: Dec. 19, 2017

(65) Prior Publication Data

US 2018/0174753 A1 Jun. 21, 2018

(30) Foreign Application Priority Data

Dec. 21, 2016 (JP) .................... 2016-247912

(51) Int. Cl.
*H01G 4/248* (2006.01)
*H01G 4/30* (2006.01)
*H01G 4/008* (2006.01)

(52) U.S. Cl.
CPC ............ *H01G 4/248* (2013.01); *H01G 4/008* (2013.01); *H01G 4/30* (2013.01)

(58) Field of Classification Search
CPC ........... H01G 4/30; H01G 4/232; H01G 4/228
See application file for complete search history.

(56) References Cited

U.S. PATENT DOCUMENTS

| | | | | | |
|---|---|---|---|---|---|
| 5,561,587 | A | * | 10/1996 | Sanada | H01B 1/16 361/306.1 |
| 8,988,850 | B1 | * | 3/2015 | Kodama | H01G 4/232 361/301.4 |
| 2004/0042155 | A1 | * | 3/2004 | Ritter | H01G 4/2325 361/309 |
| 2015/0162132 | A1 | * | 6/2015 | Kwag | H01G 4/30 174/260 |
| 2017/0154729 | A1 | * | 6/2017 | Lee | H01G 4/30 |
| 2018/0151295 | A1 | * | 5/2018 | Iwai | H01G 2/065 |

FOREIGN PATENT DOCUMENTS

JP 11-162771 A 6/1999
JP 2010226017 A * 10/2010

OTHER PUBLICATIONS

Japanese application—JP 2016232116 (Year: 2016).*

* cited by examiner

*Primary Examiner* — Eric W Thomas
(74) *Attorney, Agent, or Firm* — Keating & Bennett, LLP

(57) ABSTRACT

A multilayer ceramic capacitor includes a laminate and first and second external electrodes that each include first and second underlying electrode layers, first and second conductive resin layers, and first and second plating layers. The first underlying electrode layer includes a portion not covered with the first conductive resin layer on an end surface of the laminate, and the first plating layer is disposed on a surface of the portion of the first underlying electrode layer. The second underlying electrode layer includes a portion not covered with the second conductive resin layer on an end surface of the laminate, and the second plating layer is disposed on a surface of the portion of the second underlying electrode layer.

9 Claims, 5 Drawing Sheets

FIG. 5A
FIG. 5B
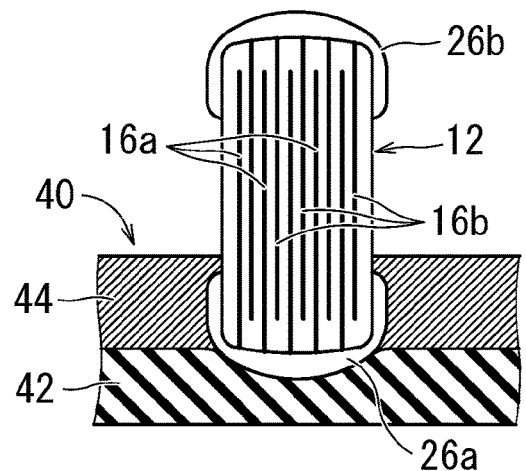
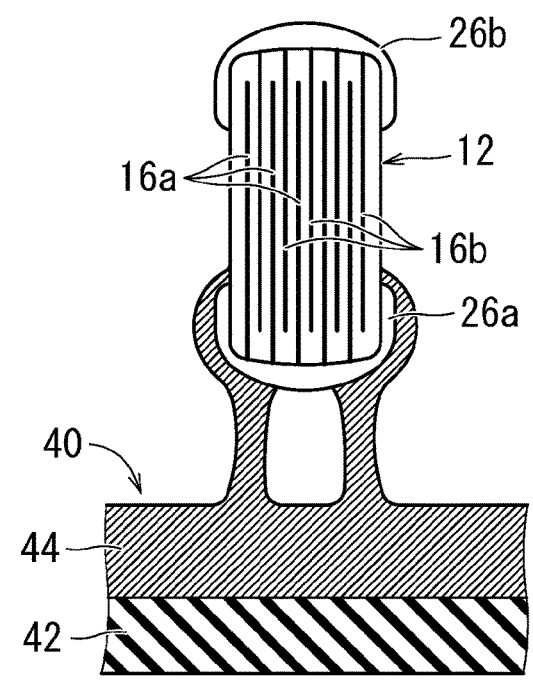

MULTILAYER CERAMIC CAPACITOR

CROSS REFERENCE TO RELATED APPLICATIONS

This application claims the benefit of priority to Japanese Patent Application No. 2016-247912 filed on Dec. 21, 2016. The entire contents of this application are hereby incorporated herein by reference.

BACKGROUND OF THE INVENTION

1. Field of the Invention

The present invention relates to a multilayer ceramic capacitor.

2. Description of the Related Art

In recent years, ceramic electronic components typified by multilayer ceramic capacitors have been used under harsher environments than ever before.

For example, multilayer ceramic capacitors for use in mobile devices, such as cellular phones and portable music players, are required to withstand dropping impacts. Specifically, the multilayer ceramic capacitors are required to avoid disconnection from mounting boards and cracking, even when subjected to dropping impacts.

In addition, multilayer ceramic capacitors for use in in-car devices, such as an ECU (Electronic Control Unit), are required to withstand thermal cycle impacts. Specifically, the multilayer ceramic capacitors are required to avoid being cracked even when subjected to deflection stress generated by thermal expansion and contraction of the mounting boards due to thermal cycles and a tensile stress applied to an external electrode.

In response to this, it has been proposed to use a thermosetting conductive resin paste in the external electrode of the multilayer ceramic capacitor. For example, in Japanese Patent Application Laid-Open No. H11-162771, an epoxy type thermosetting resin layer is provided between an electrode layer and a nickel plating layer, and countermeasures are taken to prevent cracks in the laminate even under a severe environment. However, in the design in which the epoxy type thermosetting resin layer is provided between the electrode layer and the nickel plating layer as in Japanese Patent Application Laid-Open No. H11-162771, contact resistance between the epoxy type thermosetting resin layer and the nickel plating layer increases, and there may be a problem that equivalent series resistance (hereinafter referred to as "ESR") increases.

SUMMARY OF THE INVENTION

Preferred embodiments of the present invention provide multilayer ceramic capacitors, which have crack reducing or preventing effects due to a conductive resin layer provided in an external electrode of the multilayer ceramic capacitors and reduce or prevent an increase in ESR.

A multilayer ceramic capacitor according to a preferred embodiment of the present invention includes a laminate including a plurality of stacked dielectric layers and the laminate including a first main surface and a second main surface facing each other in a stacking direction, a first side surface and a second side surface facing each other in a width direction orthogonal or substantially orthogonal to the stacking direction, and a first end surface and a second end surface facing each other in a length direction orthogonal or substantially orthogonal to the stacking direction and the width direction, a first internal electrode exposed from the first end surface and a second internal electrode exposed from the second end surface, the first internal electrode and the second internal electrode being alternately stacked with one of the dielectric layers interposed therebetween, and a first external electrode connected to the first internal electrode and disposed on a surface of the first end surface, portions of surfaces of the first main surface and the second main surface, and portions of surfaces of the first side surface and the second side surface, and a second external electrode connected to the second internal electrode and disposed on a surface of the second end surface, portions of the surfaces of the first main surface and the second main surface, and portions of the surfaces of the first side surface and the second side surface. In this multilayer ceramic capacitor, the first external electrode includes a first underlying electrode layer including conductive metal and a glass component, a first conductive resin layer disposed on a surface of the first underlying electrode layer and including a thermosetting resin and metal, and a first plating layer disposed on a surface of the first conductive resin layer, the second external electrode includes a second underlying electrode layer including conductive metal and a glass component, a second conductive resin layer disposed on a surface of the second underlying electrode layer and including a thermosetting resin and metal, and a second plating layer disposed on a surface of the second conductive resin layer, the first underlying electrode layer includes on the first end surface a portion not covered with the first conductive resin layer, the second underlying electrode layer includes on the second end surface a portion not covered with the second conductive resin layer, the first plating layer is disposed on a surface of the portion of the first underlying electrode layer, which is not covered with the first conductive resin layer, and the second plating layer is disposed on a surface of the portion of the second underlying electrode layer, which is not covered with the second conductive resin layer.

In a multilayer ceramic capacitor according to a preferred embodiment of the present invention, it is preferable that the first conductive resin layer is provided on a surface of the first underlying electrode layer located on a ridge line portion and a corner portion defined by each intersection of the first end surface, the first main surface, the second main surface, the first side surface and the second side surface of the laminate, and the second conductive resin layer is provided on a surface of the second underlying electrode layer located on a ridge line portion and a corner portion defined by each intersection of the second end surface, the first main surface, the second main surface, the first side surface and the second side surface of the laminate.

Further, in a multilayer ceramic capacitor according to a preferred embodiment of the present invention, it is preferable that an exposure ratio of the portion of the first underlying electrode layer on the first end surface, which is not covered with the first conductive resin layer, and an exposure ratio of the portion of the second underlying electrode layer on the second end surface, which is not covered with the second conductive resin layer, are not less than about 5%.

Further, in a multilayer ceramic capacitor according to a preferred embodiment of the present invention, it is preferable that the exposure ratio of the portion of the first underlying electrode layer on the first end surface, which is not covered with the first conductive resin layer, and the exposure ratio of the portion of the second underlying electrode layer on the second end surface, which is not covered with the second conductive resin layer, are not less than about 30%.

Further, in a multilayer ceramic capacitor according to a preferred embodiment of the present invention, it is preferable that the exposure ratio of the portion of the first underlying electrode layer on the first end surface, which is not covered with the first conductive resin layer, and the exposure ratio of the portion of the second underlying electrode layer on the second end surface, which is not covered with the second conductive resin layer, are not less than about 30% and not more than about 82%.

In a multilayer ceramic capacitor according to a preferred embodiment of the present invention, it is preferable that the first underlying electrode layer disposed on the surface of the first end surface is structured such that a thickness thereof at a central portion of the first end surface is larger than a thickness of the other portions, and the second underlying electrode layer disposed on the surface of the second end surface is structured such that a thickness thereof at a central portion of the second end surface is larger than a thickness of the other portions.

A method of manufacturing a multilayer ceramic capacitor according to a preferred embodiment of the present invention is a method of manufacturing a multilayer ceramic capacitor including a laminate including a plurality of stacked dielectric layers and the laminate including a first main surface and a second main surface facing each other in a stacking direction, a first side surface and a second side surface facing each other in a width direction orthogonal or substantially orthogonal to the stacking direction, and a first end surface and a second end surface facing each other in a length direction orthogonal or substantially orthogonal to the stacking direction and the width direction, a first internal electrode exposed from the first end surface and a second internal electrode exposed from the second end surface, the first internal electrode and the second internal electrode being alternately stacked with one of the dielectric layers interposed therebetween, and a first external electrode connected to the first internal electrode and disposed on a surface of the first end surface, portions of surfaces of the first main surface and the second main surface, and portions of surfaces of the first side surface and the second side surface, and a second external electrode connected to the second internal electrode and disposed on a surface of the second end surface, portions of the surfaces of the first main surface and the second main surface, and portions of the surfaces of the first side surface and the second side surface. In this multilayer ceramic capacitor, the first external electrode includes a first underlying electrode layer including conductive metal and a glass component, a first conductive resin layer disposed on a surface of the first underlying electrode layer and including a thermosetting resin and metal, and a first plating layer disposed on a surface of the first conductive resin layer, the second external electrode includes a second underlying electrode layer including conductive metal and a glass component, a second conductive resin layer disposed on a surface of the second underlying electrode layer and including a thermosetting resin and metal, and a second plating layer disposed on a surface of the second conductive resin layer, the first conductive resin layer is disposed to cover the first underlying electrode layer except for a central portion of the first underlying electrode layer or the central portion of the first underlying electrode layer and the surface of the first underlying electrode layer disposed on the surfaces of the first main surface and the second main surface and the surfaces of the first side surface and the second side surface, and the second conductive resin layer is disposed to cover the second underlying electrode layer except for a central portion of the second underlying electrode layer or the central portion of the second underlying electrode layer and the surface of the second underlying electrode layer disposed on the surfaces of the first main surface and the second main surface and the surfaces of the first side surface and the second side surface. This method includes a step of preparing the laminate, a step of applying an underlying electrode paste including conductive metal and a glass component, onto a surface of the first end surface, portions of surfaces of the first main surface and the second main surface, and portions of surfaces of the first side surface and the second side surface of the laminate to form the first underlying electrode layer, and applying an underlying electrode paste including conductive metal and a glass component, onto a surface of the second end surface, portions of surfaces of the first main surface and the second main surface, and portions of surfaces of the first side surface and the second side surface to form the second underlying electrode layer, and a step of applying a conductive resin paste, including a thermosetting resin and metal, onto the surfaces of the first underlying electrode layer and the second underlying electrode layer. In the step of applying the conductive resin paste including a thermosetting resin and metal, the surfaces of the first underlying electrode layer and the second underlying electrode layer are pressed against a paste storage portion provided on its bottom with a rubber surface plate and are pulled away to be applied with the conductive resin paste.

A method of manufacturing a multilayer ceramic capacitor according to a preferred embodiment of the present invention preferably further includes, in the step of applying the conductive resin paste including a thermosetting resin and metal, a step of pressing each of the first end surface and the second end surface of the laminate onto which the conductive resin paste is applied against a transfer stage provided on its bottom with a metal surface plate and controlling the amount of the conductive resin paste applied onto the first end surface and the second end surface of the laminate.

Furthermore, in a method of manufacturing a multilayer ceramic capacitor according to a preferred embodiment of the present invention, it is preferable that the number of times of pressing the first end surface and the second end surface of the laminate against the transfer stage is not less than three times in each of the first end surface and the second end surface, and this method preferably further includes a step of removing the conductive resin paste adhering to the transfer stage, by a squeegee each time the pressing is performed.

With a multilayer ceramic capacitor according to a preferred embodiment of the present invention, the first underlying electrode layer includes the portion not covered with the first conductive resin layer on the first end surface, the second underlying electrode layer includes the portion not covered with the second conductive resin layer on the second end surface, the first plating layer is disposed on the surface of the portion not covered with the first conductive resin layer of the first underlying electrode layer, and the second plating layer is disposed on the surface of the portion not covered with the second conductive resin layer of the second underlying electrode layer. Therefore, the portion of the first underlying electrode layer is not covered with the high resistance first conductive resin layer, so that the extent to which the first conductive resin layer covers the first underlying electrode layer is able to be reduced, and the portion of the second underlying electrode layer is not covered with the high resistance second conductive resin layer, so that the extent to which the second conductive resin layer covers the second underlying electrode layer is able to be reduced, such that ESR of the multilayer ceramic capacitor is able to be reduced.

In a multilayer ceramic capacitor according to a preferred embodiment of the present invention, when the first conductive resin layer is provided on the surface of the first underlying electrode layer located on the ridge line portion and the corner portion defined by each intersection of the first end surface, the first main surface, the second main surface, the first side surface and the second side surface of the laminate, and when the second conductive resin layer is provided on the surface of the second underlying electrode layer located on the ridge line portion and the corner portion defined by each intersection of the second end surface, the first main surface, the second main surface, the first side surface and the second side surface of the laminate, it is possible to maintain the crack reducing or preventing effects due to the first conductive resin layer and the second conductive resin layer.

Further, in a multilayer ceramic capacitor according to a preferred embodiment of the present invention when the exposure ratio of the portion of the first underlying electrode layer on the first end surface, which is not covered with the first conductive resin layer, and the exposure ratio of the portion of the second underlying electrode layer on the second end surface, which is not covered with the second conductive resin layer, are not less than about 5%, the extent to which the first underlying electrode layer is covered with the first conductive resin layer is able to be reduced, and the extent to which the second underlying electrode layer is covered with the second conductive resin layer is able to be reduced, so that the extent to which each of the first and second underlying electrode layers is covered is able to be optimized, such that it is possible to obtain a multilayer ceramic capacitor having an effect of further reducing the ESR.

Further, in a multilayer ceramic capacitor according to a preferred embodiment of the present invention when the exposure ratio of the portion of the first underlying electrode layer on the first end surface, which is not covered with the first conductive resin layer, and the exposure ratio of the portion of the second underlying electrode layer on the second end surface, which is not covered with the second conductive resin layer, are not less than about 30%, the extent to which the first underlying electrode layer is covered with the first conductive resin layer is able to be reduced, and the extent to which the second underlying electrode layer is covered with the second conductive resin layer is able to be reduced, so that the extent to which each of the first and second underlying electrode layers is covered is able to be optimized, such that it is possible to obtain a multilayer ceramic capacitor having an effect of further reducing the ESR.

Further, in a multilayer ceramic capacitor according to a preferred embodiment of the present invention when the exposure ratio of the portion of the first underlying electrode layer on the first end surface, which is not covered with the first conductive resin layer, and the exposure ratio of the portion of the second underlying electrode layer on the second end surface, which is not covered with the second conductive resin layer, are not less than about 30% and not more than about 82%, the extent to which the first underlying electrode layer is covered with the first conductive resin layer is able to be reduced, and the extent to which the second underlying electrode layer is covered with the second conductive resin layer is able to be reduced, so that the extent to which each of the first and second electrode layers is covered is able to be optimized, such that it is possible to provide the effect of reducing the ESR and in addition maintain the crack reducing or preventing effect due to the first conductive resin layer and the second conductive resin layer.

In a multilayer ceramic capacitor according to a preferred embodiment of the present invention if the first underlying electrode layer disposed on the surface of the first end surface is structured such that a thickness thereof at the central portion of the first end surface is larger than a thickness of the other portions, and if the second underlying electrode layer disposed on the surface of the second end surface is structured such that a thickness thereof at the central portion of the second end surface is larger than a thickness of the other portions, in the method of manufacturing a multilayer ceramic capacitor, in the step of applying the conductive resin paste for forming the conductive resin layer on the surface of the underlying electrode layer, when the end surface of the laminate is pressed against the rubber surface plate, the conductive resin paste held between the end surface central portion of the laminate and the rubber surface place is pushed out therearound, so that a portion at which the conductive resin layer is not disposed around the end surface central portion of the laminate is able to be easily formed.

In a method of manufacturing a multilayer ceramic capacitor according to a preferred embodiment of the present invention, in the step of applying the conductive resin paste including a thermosetting resin and metal, onto the surfaces of the first underlying electrode layer and the second underlying electrode layer, since the surfaces of the first underlying electrode layer and the second underlying electrode layer are pressed against the paste storage portion provided on its bottom with a rubber surface plate and are pulled away to be applied with the conductive resin paste, the conductive resin paste is able to be applied to cover the underlying electrode layer except for the central portion of the underlying electrode layer, and a portion in which the conductive resin paste is not applied is able to be formed at the central portion of the underlying electrode layer.

Further, a method of manufacturing a multilayer ceramic capacitor according to a preferred embodiment of the present invention further includes, in the step of applying the conductive resin paste including a thermosetting resin and metal, the step of pressing each of the first end surface and the second end surface of the laminate onto which the conductive resin paste is applied against the transfer stage provided on its bottom with the metal surface plate and controlling the amount of the conductive resin paste applied onto the first end surface and the second end surface of the laminate, such that it is possible to control an application amount of the conductive resin paste and, consequently, to control the exposure ratio of the underlying electrode layer.

Furthermore, in a method of manufacturing a multilayer ceramic capacitor according to a preferred embodiment of the present invention, the number of times of pressing the first end surface and the second end surface of the laminate against the transfer stage is not less than three times in each of the first end surface and the second end surface, and this method further includes the step of removing the conductive resin paste adhering to the transfer stage, by a squeegee each time the pressing is performed, such that it is possible to more finely control the application amount of the conductive resin paste and, thus, to precisely control the exposure ratio of the underlying electrode layer.

According to various preferred embodiments of the present invention, it is possible to obtain multilayer ceramic capacitors, which achieve crack reducing or preventing effects due to the conductive resin layer provided in an external electrode of the multilayer ceramic capacitors and, meanwhile, which reduce or prevent an increase in the ESR.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A and 5B are views showing a method of applying a conductive resin paste onto an end surface of a laminate provided with an underlying electrode layer, in a method of manufacturing the multilayer ceramic capacitor according to a preferred embodiment of the present invention, FIG. 5A shows a state in which the end surface of the laminate is pressed against a rubber surface plate with the conductive resin paste, and FIG. 5B shows a state in which the laminate is pressed against the rubber surface plate with the conductive resin paste and then pulled away.

DETAILED DESCRIPTION OF THE INVENTION

Figure 1:
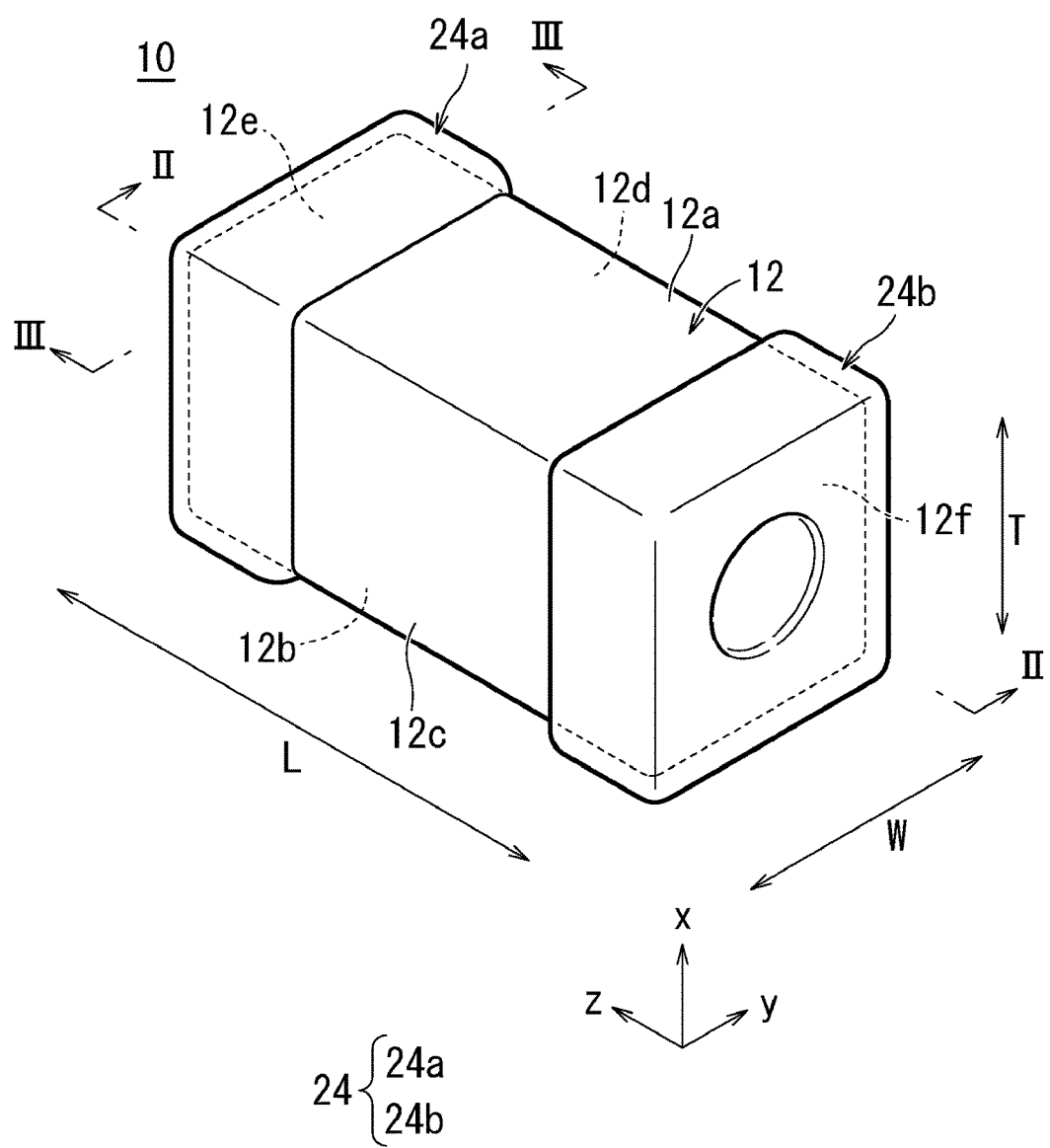
FIG. 1 is an external perspective view showing an example of a multilayer ceramic capacitor according to a preferred embodiment of the present invention.
Figure 2:
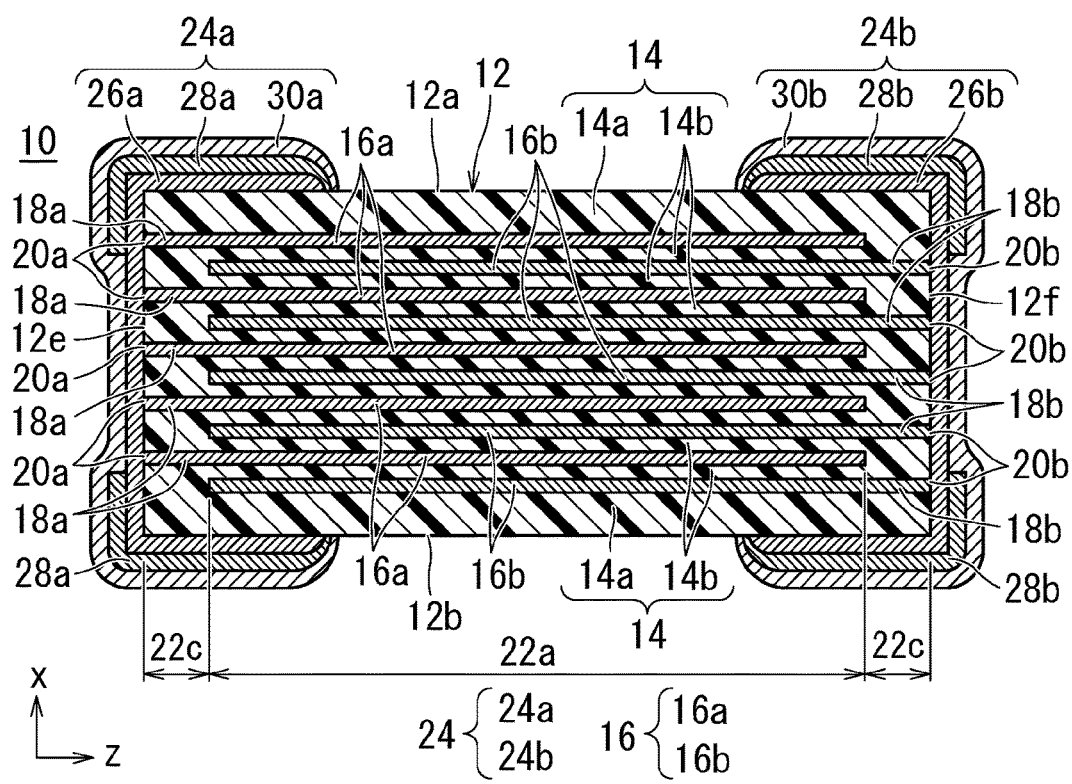
FIG. 2 is a cross-sectional view taken along a line II-II of FIG. 1 showing a multilayer ceramic capacitor according to a preferred embodiment of the present invention.
Figure 3:
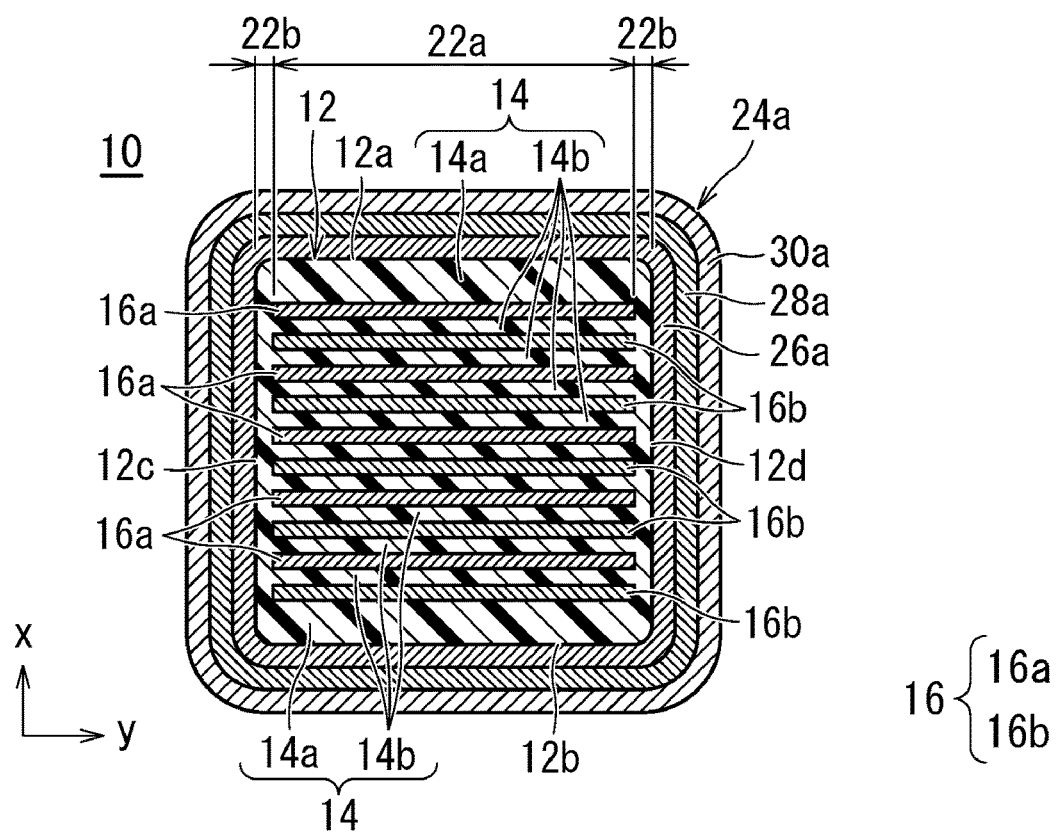
FIG. 3 is a cross-sectional view taken along a line III-III of FIG. 1 showing a multilayer ceramic capacitor according to a preferred embodiment of the present invention
Figure 4:
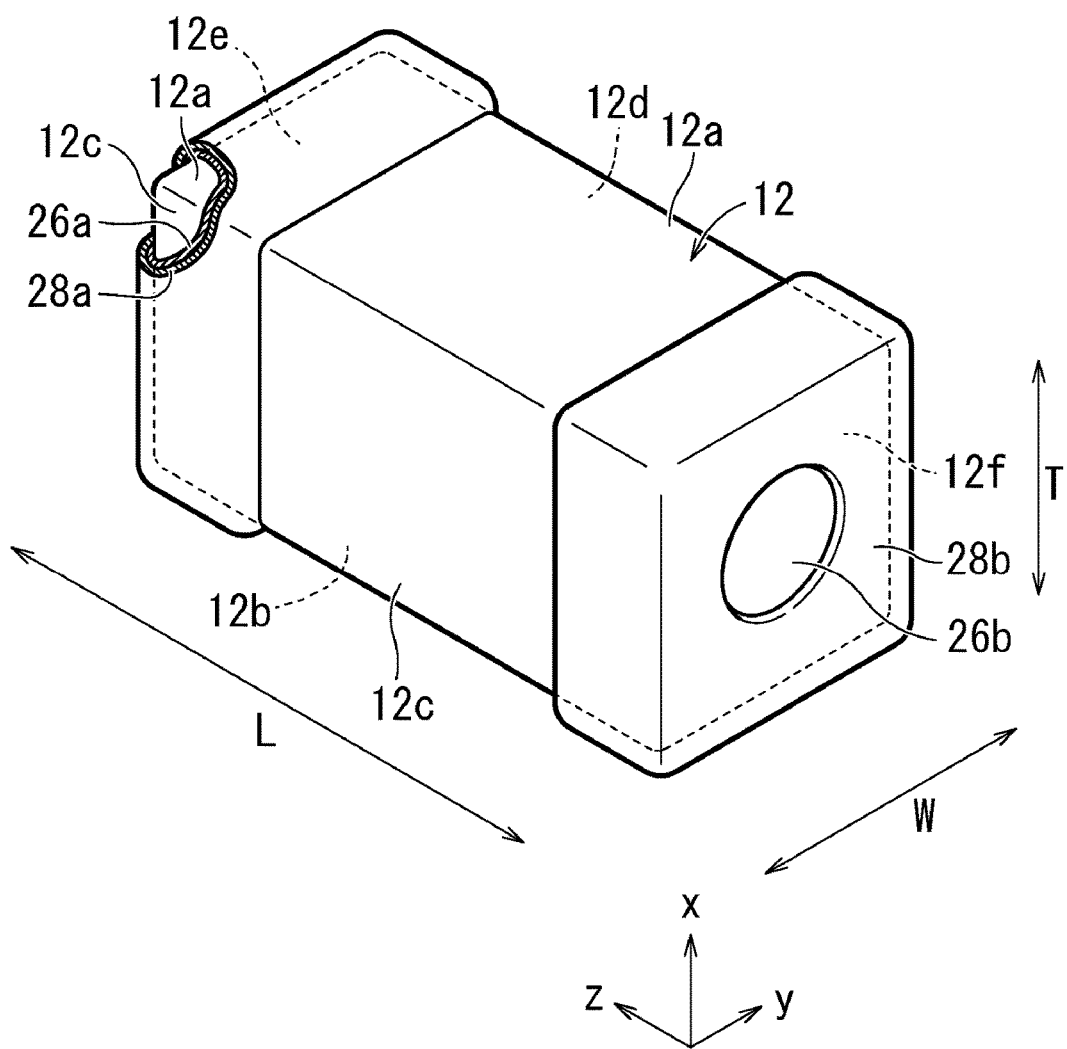
FIG. 4 is an external perspective view of a multilayer ceramic capacitor according to a preferred embodiment of the present invention, in which a plating layer is omitted.

Multilayer ceramic capacitors according to preferred embodiments of the present invention will be described. FIG. 1 is an external perspective view showing an example of the multilayer ceramic capacitor according to a preferred embodiment of the present invention. FIG. 2 is a cross-sectional view taken along a line II-II of FIG. 1 showing the multilayer ceramic capacitor according to a preferred embodiment of the present invention, and FIG. 3 is a cross-sectional view taken along a line III-III of FIG. 1 showing the multilayer ceramic capacitor according to a preferred embodiment of the present invention. FIG. 4 is an external perspective view of a multilayer ceramic capacitor according to a preferred embodiment of the present invention, in which a plating layer is omitted.

As shown in FIGS. 1 to 4, a multilayer ceramic capacitor includes a rectangular or substantially rectangular parallelepiped laminate 12.

The laminate 12 includes a plurality of stacked dielectric layers 14 and a plurality of stacked internal electrodes 16. The laminate 12 further includes a first main surface 12a and a second main surface 12b facing each other in a stacking direction x, a first side surface 12c and a second side surface 12d facing each other in a width direction y orthogonal or substantially orthogonal to the stacking direction x, and a first end surface 12e and a second end surface 12f facing each other in a length direction z orthogonal or substantially orthogonal to the stacking direction x and the width direction y. It is preferable that the laminate 12 is rounded at the corner portions and the ridge line portions. The corner portion is a portion at which three adjacent surfaces of the laminate intersect, and the ridge line portion is a portion at which two adjacent surfaces of the laminate intersect. In addition, unevenness or other abnormalities may be provided on a portion or the whole of the first main surface 12a and the second main surface 12b, the first side surface 12c and the second side surface 12d, and the first end surface 12e and the second end surface 12f.

The dielectric layer 14 includes an outer layer portion 14a and an inner layer portion 14b. The outer layer portions 14a is located on one of the first main surface 12a side and the second main surface 12b side of the laminate 12 and is one of the dielectric layer 14 located between the first main surface 12a and the internal electrode 16 closest to the first main surface 12a and the dielectric layer 14 located between the second main surface 12b and the internal electrode 16 closest to the second main surface 12b. A region sandwiched between both outer layer portions 14a is the inner layer portion 14b. The thickness of the outer layer portion 14a is preferably not less than about 30 μm and not more than about 300 μm, for example.

The dielectric layer 14 may be made of, for example, a dielectric material. As the dielectric material, for example, a dielectric ceramic including a component, such as $BaTiO_3$, $CaTiO_3$, $SrTiO_3$, or $CaZrO_3$, may be used. When the dielectric ceramic includes the above-described dielectric material as a main component, depending on the properties of the desired laminate 12, the dielectric ceramic may include an accessory component whose content is smaller than that of the main component, and examples of the accessory component include a Mn compound, an Fe compound, a Cr compound, a Co compound, and a Ni compound.

The thickness of the dielectric layer 14 after firing is preferably not less than about 0.4 μm and not more than about 20 μm, for example.

In addition, the number of the dielectric layers is preferably not less than about 25 and not more than about 1000, including the outer layer portion 14a and the inner layer portion 14b.

The dimensions of the laminate 12 are preferably structured such that the L dimension in the length direction z is not less than about 0.4 mm and not more than about 6.0 mm, the W dimension in the width direction y is not less than about 0.2 mm and not more than about 5.5 mm, and the T dimension in the stacking direction x is not less than about 0.2 mm and not more than about 3.0 mm, for example. The L dimension in the length direction z is not necessarily longer than the W dimension in the width direction y. The dimensions of the multilayer ceramic capacitor 10 may be measured with a microscope.

The laminate 12 includes, for example, a plurality of rectangular or substantially rectangular first internal electrodes 16a and a plurality of rectangular or substantially rectangular second internal electrodes 16b as the plurality of internal electrodes 16. The plurality of first internal electrodes 16a and the plurality of second internal electrodes 16b are buried so as to be alternately arranged at regular intervals along the stacking direction x of the laminate 12.

On one end side of the first internal electrode 16a, a first lead electrode portion 18a extends to the first end surface 12e of the laminate 12. An end portion of the first lead electrode portion 18a extends to a surface of the first end surface 12e of the laminate 12 to be exposed and includes a first exposure portion 20a.

On one end side of the second internal electrode 16b, a second lead electrode portion 18b extends to the second end surface 12f of the laminate 12. An end portion of the second lead electrode portion 18b extends to a surface of the second end surface 12f of the laminate 12 to be exposed and includes a second exposure portion 20b.

The laminate 12 includes a counter electrode portion 22a in which the first internal electrode 16a and the second internal electrode 16b face each other in the inner layer portion 14b of the dielectric layer 14. The laminate 12 further includes a side portion (hereinafter referred to as a "W gap") 22b of the laminate 12, which is provided between one end of the counter electrode portion 22a in the width direction y and the first side surface 12c and between the other end of the counter electrode portion 22a in the width direction y and the second side surface 12d. The laminate 12 furthermore includes an end portion (hereinafter referred to as an "L gap") 22c of the laminate 12, which is provided between an end portion on the side opposite to the first lead electrode portion 18a of the first internal electrode 16a and the second end surface 12f and between an end portion on the side opposite to the second lead electrode portion 18b of the second internal electrode 16b and the first end surface 12e.

The internal electrode 16 preferably includes, for example, metal such as Ni, Cu, Ag, Pd, and Au or a suitable conductive material such as an alloy containing at least one of those metals, for example an Ag—Pd alloy. The internal electrode may further include dielectric grains having the same or substantially the same composition system as ceramics included in the dielectric layer 14.

The thickness of the internal electrode 16 is preferably not less than about 0.2 μm and not more than about 2.0 μm, for example. Further, the number of the internal electrodes 16 is preferably not less than about 10 and not more than about 900, for example.

An external electrode 24 is disposed on the first end surface 12e side and the second end surface 12f side of the laminate 12. The external electrode 24 includes a first external electrode 24a and a second external electrode 24b.

The first external electrode 24a is disposed on the first end surface 12e side of the laminate 12. The first external electrode 24a covers the first end surface 12e of the laminate 12 and extends from the first end surface 12e and partially cover the first main surface 12a, the second main surface 12b, the first side surface 12c, and the second side surface 12d. In this case, the first external electrode 24a is electrically connected to the first internal electrode 16a with the first exposure portion 20a interposed therebetween.

The second external electrode 24b is disposed on the second end surface 12f side of the laminate 12. The second external electrode 24b covers the second end surface 12f of the laminate 12 and extends from the second end surface 12f and partially cover the first main surface 12a, the second main surface 12b, the first side surface 12c, and the second side surface 12d. In this case, the second external electrode 24b is electrically connected to the second internal electrode 16b with the second exposure portion 20b interposed therebetween.

In the laminate 12, the first internal electrode 16a and the second internal electrode 16b face each other with the dielectric layer 14 interposed therebetween at each of the counter electrode portions 22a to produce an electrostatic capacitance. Thus, an electrostatic capacitance is able to be obtained between the first external electrode 24a to which the first internal electrode 16a is connected and the second external electrode 24b to which the second internal electrode 16b is connected, and characteristics of the capacitor are developed.

The first external electrode 24a includes a first underlying electrode layer 26a including conductive metal and glass, a first conductive resin layer 28a disposed on a surface of the first underlying electrode layer 26a and including a thermosetting resin and metal, and a first plating layer 30a disposed on a surface of the first conductive resin layer 28a.

Similarly, the second external electrode 24b includes a second underlying electrode layer 26b including conductive metal and glass, a second conductive resin layer 28b disposed on a surface of the second underlying electrode layer 26b and including a thermosetting resin and metal, and a second plating layer 30b disposed on a surface of the second conductive resin layer 28b.

The first underlying electrode layer 26a is disposed on the surface of the first end surface 12e of the laminate 12 and is structured to extend from the first end surface 12e and partially cover the first main surface 12a, the second main surface 12b, the first side surface 12c, and the second side surface 12d.

The second underlying electrode layer 26b is disposed on the surface of the second end surface 12f of the laminate 12 and is structured to extend from the second end surface 12f and partially cover the first main surface 12a, the second main surface 12b, the first side surface 12c, and the second side surface 12d.

The first underlying electrode layer 26a may be disposed only on the surface of the first end surface 12e of the laminate 12, and the second underlying electrode layer 26b may be disposed only on the surface of the second end surface 12f of the laminate 12.

The first underlying electrode layer 26a includes a portion not covered with the first conductive resin layer 28a on the first end surface 12e, and the first plating layer 30a is disposed on a surface of a portion of the first underlying electrode layer 26a, which is not covered with the first conductive resin layer 28a. Specifically, the first underlying electrode layer 26a disposed on the surfaces of the first and second main surfaces 12a and 12b and the first and second side surfaces 12c and 12d is covered with the first conductive resin layer 28a and includes a portion not covered with the first conductive resin layer 28a in the first end surface 12e. The first plating layer 30a is disposed directly on the surface of a portion not covered with the first conductive resin layer 28a without having the first conductive resin layer 28a interposed therebetween.

The second underlying electrode layer 26b includes a portion not covered with the second conductive resin layer 28b in the second end surface 12f, and the second plating layer 30b is disposed on a surface of a portion not covered with the second conductive resin layer 28b in the second underlying electrode layer 26b. Specifically, the second underlying electrode layer 26b disposed on the surfaces of the first and second main surfaces 12a and 12b and the first and second side surfaces 12c and 12d is covered with the second conductive resin layer 28b and includes a portion not covered with the second conductive resin layer 28b in the second end surface 12f. The second plating layer 30b is disposed directly on the surface of a portion not covered with the second conductive resin layer 28b without having the second conductive resin layer 28b interposed therebetween.

It is preferable that the exposure ratio of the portion of the first underlying electrode layer 26a on the first end surface 12e, which is not covered with the first conductive resin layer 28a, is not less than about 5%, for example. Further, it is preferable that the exposure ratio of the portion of the first underlying electrode layer 26a on the first end surface 12e, which is not covered with the first conductive resin layer 28a, is not less than about 30%, for example. Furthermore, it is more preferable that the exposure ratio of the portion of the first underlying electrode layer 26a on the first end surface 12e, which is not covered with the first conductive resin layer 28a, is not less than about 30% and not more than about 82%, for example.

Similarly, it is preferable that the exposure ratio of the portion of the second underlying electrode layer 26b on the second end surface 12f, which is not covered with the second conductive resin layer 28b, is not less than about 5%, for example. Further, it is preferable that the exposure ratio of the portion of the second underlying electrode layer 26b on the second end surface 12f, which is not covered with the second conductive resin layer 28b, is not less than about 30%, for example. Furthermore, it is more preferable that the exposure ratio of the portion of the second underlying electrode layer 26b on the second end surface 12f, which is not covered with the second conductive resin layer 28b, is not less than about 30% and not more than about 82%, for example.

The shape of the portion not covered with the first conductive resin layer 28a on the first end surface 12e and the shape of the portion not covered with the second conductive resin layer 28b on the second end surface 12f are not particularly limited, and the first underlying electrode layer 26a and the second underlying electrode layer 26b may be exposed in a rectangular, substantially rectangular, circular, substantially circular, elliptical, or substantially elliptical shape, for example. Although the first underlying electrode layer 26a and the second underlying electrode layer 26b may be partially exposed in a point shape, for example, it is preferable that the first underlying electrode layer 26a and the second underlying electrode layer 26b are exposed in a circular, substantially circular, elliptical, or substantially elliptical shape. Consequently, the continuity of the first plating layer 30a at a boundary portion between the exposure portion of the first underlying electrode layer 26a and the first conductive resin layer 28a and the continuity of the second plating layer 30b at a boundary portion between the exposure portion of the second underlying electrode layer 26b and the second conductive resin layer 28b are improved, so that solder wetting-up to the first plating layer 30a and the second plating layer 30b is improved.

The exposure ratio of the portion not covered with the first conductive resin layer 28a on the first end surface 12e with respect to the first underlying electrode layer 26a and the exposure ratio of the portion not covered with the second conductive resin layer 28b on the second end surface 12f with respect to the second underlying electrode layer 26b are obtained as described below.

First, as a method of calculating an exposure area, the calculation is performed by observing a polished cross section of the multilayer ceramic capacitor 10. Specifically, 20 cross sections are observed at a pitch of about 30 μm in the width direction y of the multilayer ceramic capacitor 10 such that an LT surface of the multilayer ceramic capacitor 10 is exposed so as to be parallel or substantially parallel to the length direction z of the multilayer ceramic capacitor 10. For the cross-section observation, observation is performed with a magnification of about 5000 times using a SEM. In each cross section, the length where the first plating layer 30a and the first underlying electrode layer 26a are in contact with each other or the length where the second plating layer 30b and the second underlying electrode layer 26b are in contact with each other (that is, the length of the exposure portion) and the length where the first plating layer 30a and the first conductive resin layer 28a are in contact with each other or the length where the second plating layer 30b and the second conductive resin layer 28b are in contact with each other are measured, and the exposure area of the first underlying electrode layer 26a or the second underlying electrode layer 26b with respect to each cross section is calculated from the length where the first plating layer 30a and the first underlying electrode layer 26a are in contact with each other or the length where the second plating layer 30b and the second underlying electrode layer 26b are in contact with each other (that is, the length of the exposure portion)×a pitch width. Finally, a value obtained by adding all values of the exposure areas calculated in the respective cross sections is taken as the exposure area of the first underlying electrode layer 26a or the second underlying electrode layer 26b. The ratio of the exposure area of the first underlying electrode layer 26a to the entire area of the first end surface 12e is taken as the exposure ratio of the portion not covered with the first conductive resin layer 28a on the first end surface 12e with respect to the first underlying electrode layer 26a, and the ratio of the exposure area of the second underlying electrode layer 26b to the entire area of the second end surface 12f is taken as the exposure ratio of the portion not covered with the second conductive resin layer 28b on the second end surface 12f with respect to the second underlying electrode layer 26b.

As shown in FIG. 4, it is preferable that the first conductive resin layer 28a is provided on the surface of the first underlying electrode layer 26a located on a ridge line portion and a corner portion defined by each intersection of the first end surface 12e, the first main surface 12a, the second main surface 12b, the first side surface 12c and the second side surface 12d of the laminate 12.

Similarly, as shown in FIG. 4, it is preferable that the second conductive resin layer 28b is provided on the surface of the second underlying electrode layer 26b located on a ridge line portion and a corner portion defined by each intersection of the second end surface 12f, the first main surface 12a, the second main surface 12b, the first side surface 12c and the second side surface 12d of the laminate 12.

As the thickness of the first underlying electrode layer 26a disposed on the surface of the first end surface 12e, the first underlying electrode layer 26a is preferably structured such that the thickness thereof at a central portion of the first end surface 12e is larger than the thickness of the other portions.

As the thickness of the second underlying electrode layer 26b disposed on the surface of the second end surface 12f, the second underlying electrode layer 26b is preferably structured such that the thickness thereof at a central portion of the second end surface 12f is larger than the thickness of the other portion.

The first underlying electrode layer 26a and the second underlying electrode layer 26b (hereinafter also simply referred to as the underlying electrode layer) include conductive metal and glass. As the conductive metal of the underlying electrode layer, the underlying electrode layer includes, for example, at least one selected from Cu, Ni, Ag, Pd, Ag—Pd alloy, Au and other suitable conductive metal.

As the glass of the underlying electrode layer, the underlying electrode layer includes at least one selected from B, Si, Ba, Mg, Al, Li and other suitable glass. The underlying electrode layer may include a plurality of layers. The underlying electrode layer is formed by applying a conductive paste including glass and metal onto the laminate 12 and baking the conductive paste, and the underlying electrode layer may be formed by being fired simultaneously with the dielectric layer 14 and the internal electrode 16 or may be formed by being baked after the dielectric layer 14 and the internal electrode 16 are fired. The thickness of the thickest portion of the underlying electrode layer is preferably not less than about 10 μm and not more than about 150 μm, for example.

The first conductive resin layer 28a is disposed to cover the first underlying electrode layer 26a except for a specific portion of the first underlying electrode layer 26a on the first end surface 12e. Specifically, the first conductive resin layer 28a is disposed to cover the first underlying electrode layer 26a disposed on the surfaces of the first and second main surfaces 12a and 12b and the first and second side surfaces 12c and 12d and to cover the first underlying electrode layer 26a except for a specific portion of the first underlying electrode layer 26a located on the first end surface 12e.

Similarly, the second conductive resin layer 28b is disposed to cover the second underlying electrode layer 26b except for a specific portion of the second underlying electrode layer 26b on the second end surface 12f. Specifically, the second conductive resin layer 28b is disposed to cover the second underlying electrode layer 26b disposed on the surfaces of the first and second main surfaces 12a and 12b and the first and second side surfaces 12c and 12d and to cover the second underlying electrode layer 26b except for a specific portion of the second underlying electrode layer 26b located on the second end surface 12f.

It is preferable that a front end portion of the first conductive resin layer 28a disposed to cover the first underlying electrode layer 26a disposed on the surfaces of the first and second main surfaces 12a and 12b and the first and second side surfaces 12c and 12d overlaps within a range of not less than about 10 μm, for example, in a direction of the second end surface 12f from a front end portion of the first underlying electrode layer 26a to be disposed on the surface of the laminate 12.

Similarly, it is preferable that a front end portion of the second conductive resin layer 28b disposed to cover the second underlying electrode layer 26b disposed on the surfaces of the first and second main surfaces 12a and 12b and the first and second side surfaces 12c and 12d overlaps within a range of not less than about 10 μm, for example in a direction of the first end surface 12e from a front end portion of the second underlying electrode layer 26b to be disposed on the surface of the laminate 12.

Consequently, the crack reducing or preventing effect due to the fact that the multilayer ceramic capacitor 10 according to a preferred embodiment of the present invention includes the first conductive resin layer 28a and the second conductive resin layer 28b is improved.

Each thickness of the first conductive resin layer 28a provided except for the central portion of the first end surface 12e and the second conductive resin layer 28b provided except for the central portion of the second end surface 12f is preferably not less than about 0.5 μm and not more than about 20 μm, for example.

The first conductive resin layer 28a and the second conductive resin layer 28b (hereinafter also simply referred to as the conductive resin layer) include a thermosetting resin and metal. Since the conductive resin layer includes a thermosetting resin, it is more flexible than the underlying electrode layer made of a baked material of a plating film or a conductive paste, for example. Thus, even when a physical impact or an impact caused by a thermal cycle is applied to the multilayer ceramic capacitor 10, the conductive resin layer functions as a buffer layer and prevents cracks from occurring in the multilayer ceramic capacitor 10.

As specific examples of the thermosetting resin, it is possible to use various known thermosetting resins, such as epoxy resin, phenol resin, urethane resin, and silicone resin, polyimide resin. Among them, epoxy resins that have outstanding heat resistance, moisture resistance, and adhesion, for example, are preferably the resins.

The conductive resin layer preferably includes a curing agent together with the thermosetting resin. When an epoxy resin is used as a base resin, various known compounds, such as phenol type, amine type, acid anhydride type, and imidazole type compounds may be used as a curing agent for the epoxy resin.

As the metal included in the conductive resin layer, Ag, Cu, or an alloy thereof may preferably be used. A metal having a surface coated with Ag may be used. When the metal having a surface coated with Ag is used, Cu or Ni, for example, is preferably used as the metal. Further, it is also possible to use Cu subjected to antioxidant treatment. The reason for using the Ag-coated metal is to make the metal of the base material inexpensive while maintaining the characteristics of Ag.

It is preferable that the metal is included in the conductive resin layer in an amount of not less than about 35 vol % and not more than about 75 vol %, for example, with respect to the volume of the entire conductive resin layer.

The shape of the metal included in the conductive resin layer is not particularly limited. The metal (conductive filler) included in the conductive resin layer may have a spherical or substantially spherical shape, a flat shape, or other suitable shapes. However, it is preferable that the metal included in the conductive resin layer is obtained by mixing spherical or substantially spherical metal and flat metal.

The average grain size of the metal included in the conductive resin layer is not particularly limited. The average grain size of the metal (conductive filler) included in the conductive resin layer may be, for example, not less than about 0.3 μm to about 10 μm.

The metal included in the conductive resin layer is primarily responsible for the conductivity of the conductive resin layer. Specifically, the metals (conductive fillers) included in the conductive resin layer are in contact with each other, such that a conductive path is provided inside the conductive resin layer.

The metal included in the conductive resin layer may include a plurality of types of metals, and include, for example, a first metal component and a second metal component. The first metal component is preferably made of, for example, Sn, In, Bi or an alloy including at least one of these metals.

In particular, the first metal component is more preferably made of an alloy including Sn or Sn, for example.

Specific examples of alloys including Sn include Sn—Ag, Sn—Bi, Sn—Ag—Cu, and other suitable alloys. The second metal component is preferably made of, for example, metal such as Cu, Ag, Pd, Pt, Au or an alloy including at least one of these metals. In particular, the second metal component is preferably Cu or Ag, for example.

The first plating layer 30a is disposed to cover the exposed first underlying electrode layer 26a and the first conductive resin layer 28a. Specifically, it is preferable that the first plating layer 30a is disposed on the surface of the portion of the first underlying electrode layer 26a, which is not covered with the first conductive resin layer 28a, and the surface of the first conductive resin layer 28a and is provided to extend to the first and second main surfaces 12a and 12b and the first and second side surfaces 12c and 12d at the surface of the first conductive resin layer 28a.

Similarly, the second plating layer 30b is disposed to cover the exposed second underlying electrode layer 26b and the second conductive resin layer 28b. Specifically, it is preferable that the second plating layer 30b is disposed on the surface of the portion of the second underlying electrode layer 26b, which is not covered with the second conductive resin layer 28b, and the surface of the second conductive resin layer 28b and is provided to reach the first and second main surfaces 12a and 12b and the first and second side surfaces 12c and 12d at the surface of the second conductive resin layer 28b.

As the first plating layer 30a and the second plating layer 30b (hereinafter also simply referred to as the plating layer), for example, at least one metal selected from Cu, Ni, Sn, Ag, Pd, Ag—Pd alloy, Au and other suitable metal or an alloy including the selected metals may preferably be used.

The plating layer may include a plurality of layers. In this case, it is preferable that the plating layer has a two-layer structure of a nickel plating layer and a tin plating layer, for example. By providing the nickel plating layer so as to cover the surfaces of the underlying electrode layer and the conductive resin layer, when the multilayer ceramic capacitor 10 is mounted, the underlying electrode layer and the conductive resin layer are prevented from being eroded by a solder used for the mounting. In addition, by providing the tin plating layer on the surface of the nickel plating layer, when the multilayer ceramic capacitor 10 is mounted, it is possible to improve wettability of a solder used for the mounting, so that the multilayer ceramic capacitor 10 is easily mounted.

The thickness per layer of the plating layers is preferably not less than about 1 μm and not more than about 15 μm, for example.

The dimension in the length direction z of the multilayer ceramic capacitor 10 including the laminate 12, the first external electrode 24a, and the second external electrode 24b is defined as the L dimension, the dimension in the stacking direction x of the multilayer ceramic capacitor 10 including the laminate 12, the first external electrode 24a and the second external electrode 24b is defined as the T dimension, and the dimension in the width direction y of the multilayer ceramic capacitor 10 including the laminate 12, the first external electrode 24a and the second external electrode 24b is defined as the W dimension.

Although the dimensions of the multilayer ceramic capacitor 10 are not particularly limited, the L dimension in the length direction z is not less than about 0.6 mm and not more than about 3.2 mm, the W dimension in the width direction y is not less than about 0.3 mm and not more than about 2.5 mm, and the T dimension in the stacking direction x is not less than about 0.3 mm and not more than about 2.5 mm, for example. The L dimension in the length direction z is not necessarily longer than the W dimension in the width direction y. The dimensions of the multilayer ceramic capacitor 10 may be measured with a microscope.

According to the multilayer ceramic capacitor 10 shown in FIG. 1, the first underlying electrode layer 26a includes the portion not covered with the first conductive resin layer 28a on the first end surface 12e, and the first plating layer 30a is disposed on the surface of the portion of the first underlying electrode layer 26a, which is not covered with the first conductive resin layer 28a. The second underlying electrode layer 26b includes the portion not covered with the second conductive resin layer 28b on the second end surface 12f, and the second plating layer 30b is disposed on a surface of a portion not covered with the second conductive resin layer 28b in the second underlying electrode layer 26b. Therefore, the portion of the first underlying electrode layer 26a is not covered with the high resistance first conductive resin layer 28a, so that the extent to which the first conductive resin layer 28a covers the first underlying electrode layer 26a is reduced. Similarly, the portion of the second underlying electrode layer 26b is not covered with the high resistance second conductive resin layer 28b, so that the extent to which the second conductive resin layer 28b covers the first underlying electrode layer 26b is reduced. Consequently, the ESR of the multilayer ceramic capacitor 10 is reduced.

According to the multilayer ceramic capacitor 10 shown in FIG. 1, the first conductive resin layer 28a exists on the surface of the first underlying electrode layer 26a located on the ridge line portion and the corner portion defined by each intersection of the first end surface 12e, the first main surface 12a, the second main surface 12b, the first side surface 12c and the second side surface 12d of the laminate 12, and the second conductive resin layer 28b exists on the surface of the second underlying electrode layer 26b located on the ridge line portion and the corner portion defined by each intersection of the second end surface 12f, the first main surface 12a, the second main surface 12b, the first side surface 12c and the second side surface 12d of the laminate 12. Therefore, it is possible to maintain the crack reducing or preventing effects due to the first conductive resin layer 28a and the second conductive resin layer 28b.

Further, according to the multilayer ceramic capacitor 10 shown in FIG. 1, when the exposure ratio of the portion of the first underlying electrode layer 26a on the first end surface 12e, which is not covered with the first conductive resin layer 28a is not less than about 5%, and when the exposure ratio of the portion of the second underlying electrode layer 26b on the second end surface 12f, which is not covered with the second conductive resin layer 28b, are not less than about 5%, the extent to which the first underlying electrode layer 26a is covered with the first conductive resin layer 28a is reduced, and, similarly, the extent to which the second underlying electrode layer 26b is covered with the second conductive resin layer 28b is reduced, so that the extent to which each of the first and second underlying electrode layers is covered is able to be optimized, such that it is possible to obtain the multilayer ceramic capacitor 10 having an effect of further reducing the ESR.

Further, according to the multilayer ceramic capacitor 10 shown in FIG. 1, when the exposure ratio of the portion of the first underlying electrode layer 26a on the first end surface 12e, which is not covered with the first conductive resin layer 28a is not less than about 30%, and when the exposure ratio of the portion of the second underlying electrode layer 26b on the second end surface 12f, which is not covered with the second conductive resin layer 28b, are not less than about 30%, the extent to which the first underlying electrode layer 26a is covered with the first conductive resin layer 28a is reduced, and, similarly, the extent to which the second underlying electrode layer 26b is covered with the second conductive resin layer 28b is reduced, so that the extent to which each of the first and second underlying electrode layers is covered is able to be optimized, such that it is possible to obtain the multilayer ceramic capacitor 10 having an effect of further reducing the ESR.

Further, according to the multilayer ceramic capacitor 10 shown in FIG. 1, when the exposure ratio of the portion of the first underlying electrode layer 26a on the first end surface 12e, which is not covered with the first conductive resin layer 28a is not less than about 30% and not more than about 82%, and when the exposure ratio of the portion of the second underlying electrode layer 26b on the second end surface 12f, which is not covered with the second conductive resin layer 28b, are not less than about 30% and not more than about 82%, the extent to which the first underlying electrode layer 26a is covered with the first conductive resin layer 28a is reduced, and, similarly, the extent to which the second underlying electrode layer 26b is covered with the second conductive resin layer 28b is reduced, so that the extent to which each of the first and second underlying electrode layers is covered is able to be optimized, such that it is possible to provide the effect of reducing the ESR and, in addition, to maintain the crack reducing or preventing effect due to the first conductive resin layer 28a and the second conductive resin layer 28b.

According to the multilayer ceramic capacitor 10 shown in FIG. 1, if the first underlying electrode layer 26a disposed on the surface of the first end surface 12e is structure such that a thickness thereof at the central portion of the first end surface 12e is larger than a thickness of the other portions, and if the second underlying electrode layer 26b disposed on the surface of the second end surface 12f is structured such that a thickness thereof at the central portion of the second end surface 12f is larger than a thickness of the other portions, in the method of manufacturing a multilayer ceramic capacitor according to a preferred embodiment of the present invention, which will be described later, in a step of applying a conductive resin paste for forming a conductive resin layer on a surface of an underlying electrode layer, when an end surface of the laminate 12 is pressed against a rubber surface plate, the conductive resin paste held between an end surface central portion of the laminate 12 and the rubber surface place is pushed out therearound, so that a portion in which the conductive resin layer is not disposed around the end surface central portion of the laminate 12 is easily formed.

Next, a method of manufacturing a multilayer ceramic capacitor having the above configurations according to a preferred embodiment of the present invention will be described by taking the multilayer ceramic capacitor 10 as an example.

First, a dielectric sheet and a conductive paste for forming the internal electrode 16 are prepared. Although the dielectric sheet and the conductive paste include an organic binder and a solvent, known organic binder and organic solvent may be used.

Then, the conductive paste for internal electrodes is printed on the dielectric sheet in a predetermined pattern, for example, and a pattern of the internal electrode 16 is formed on the dielectric sheet. The conductive paste for internal electrodes may be printed by a known method, such as screen printing or gravure printing, for example.

Then, a predetermined number of dielectric sheets for outer layers on which the pattern of the internal electrode 16 is not printed are stacked, dielectric sheets on which the internal electrode pattern is printed are sequentially stacked thereon, and a predetermined number of the dielectric sheets for outer layers are stacked thereon, thus producing a laminate block. If necessary, this laminate block may be pressure-bonded in the stacking direction by isostatic pressing, for example.

Thereafter, the laminate block is cut out in a predetermined shape dimension to cut out a green laminate chip. At this time, corner portions or ridge line portions of the laminate may be rounded by barrel polishing or other suitable process.

Subsequently, the green laminate chip that is cut out is fired to produce a laminate. Although a firing temperature of the green laminate chip depends on a material of a dielectric body or a material of the conductive paste for internal electrodes, the firing temperature is preferably not less than about 900° C. and not more than about 1300° C., for example.

Then, the underlying electrode paste including conductive metal and a glass component is applied onto the first end surface 12e, portions of surfaces of the first main surface 12a and the second main surface 12b, and portions of surfaces of the first side surface 12c and the second side surface 12d of the laminate 12 after firing. The underlying electrode paste is then baked to form the first underlying electrode layer 26a of the first external electrode 24a. In addition, the underlying electrode paste including conductive metal and a glass component is applied onto the second end surface 12f, portions of the surfaces of the first main surface 12a and the second main surface 12b, and portions of the surfaces of the first side surface 12c and the second side surface 12d of the laminate 12 after firing. The underlying electrode paste is then baked to form the second underlying electrode layer 26b of the second external electrode 24b. The underlying electrode paste is applied onto both end surfaces of the laminate 12 by, for example, dipping. The baking temperature is preferably not less than about 700° C. and not more than about 900° C., for example. The underlying electrode paste may be applied by immersing the laminate in the underlying electrode paste a plurality of times.

Subsequently, the step of applying the conductive resin paste will be described.

First, the paste storage portion 40 used in the step of applying the conductive resin paste will be described. FIG. 5 is a view showing the method of applying the conductive resin paste onto the end surface of the laminate formed with the underlying electrode layer, in the method of manufacturing the multilayer ceramic capacitor according to the present preferred embodiment of this invention, FIG. 5A shows a state in which the end surface of the laminate is pressed against a rubber surface plate with the conductive resin paste, and FIG. 5B shows a state in which the laminate is pressed against the rubber surface plate with the conductive resin paste and then pulled away.

The paste storage portion 40 is provided with a rubber surface plate 42 at its bottom portion, and a conductive resin paste 44 is stored in the paste storage portion 40 including the rubber surface plate 42.

As the rubber surface plate 42 used in the paste storage portion 40, rubber described below may be used, and the exposure area of the underlying electrode layer may be controlled by changing the type of rubber to be used, the pushing amount of the end surface of the laminate 12 with respect to rubber, the pulling speed of the laminate 12, and other parameters and factors.

As the type of rubber used as the rubber surface plate 42, fluoro rubber, urethane rubber, acrylic rubber, butyl rubber, nitrile rubber, chloropropylene rubber or other suitable rubbers, for example, may be used. The thickness of the rubber surface plate 42 is preferably not less than about 0.1 mm and not more than about 10 mm, for example. The hardness of the rubber surface plate 42 is preferably not less than about A20 and not more than about A95 in Shore hardness, for example.

The conductive resin paste 44 includes a thermosetting resin and metal.

As specific examples of the thermosetting resin included in the conductive resin paste 44, it is possible to use various known thermosetting resins, such as epoxy resin, phenol resin, urethane resin, and silicone resin, polyimide resin. Among them, epoxy resins having excellent heat resistance, moisture resistance, and adhesion, for example are preferable resins.

As the metal included in the conductive resin paste 44, Ag, Cu, or an alloy thereof, for example, may be used. A metal including a surface coated with Ag, for example, may be used. Further, as the metal included in the conductive resin paste 44, the conductive resin paste 44 may include a plurality of types of metals, and may be made of, for example, a first metal component and a second metal component. The first metal component is preferably made of, for example, Sn, In, Bi or an alloy containing at least one of these metals. In particular, the first metal component is more preferably made of an alloy including Sn or Sn. Specific examples of alloys including Sn include Sn—Ag, Sn—Bi, Sn—Ag—Cu, and other suitable alloys, for example. The second metal component is preferably made of, for example, metal such as Cu, Ag, Pd, Pt, Au or an alloy including at least one of these metals, for example. In particular, the second metal component is preferably Cu or Ag, for example.

Subsequently, a step of applying the conductive resin paste onto the laminate using the paste storage portion 40 will be described.

First, as shown in FIG. 5A, the end surface of the laminate 12 formed with the underlying electrode layer is pressed against the rubber surface plate 42 of the paste storage portion 40, and subsequently, as shown in FIG. 5B, the laminate is pulled away to be applied with the conductive resin paste 44. When one of the end surfaces of the laminate 12 is pressed against the rubber surface plate 42 of the paste storage portion 40, the other end surface may be elastically retained by an elastic body, or may be held by an adhesive. After the laminate 12 is pressed against the rubber surface plate 42, the pulling speed is preferably not less than about 2 mm/s and not more than about 40 mm/s, for example.

In the step of applying the conductive resin paste onto the laminate, the manufacturing method preferably further includes a step of pressing each of the first end surface 12*e* and the second end surface 12*f* of the laminate 12 onto which the conductive resin paste 44 is applied against a transfer stage provided on its bottom with a metal surface plate and controlling the amount of the conductive resin paste applied onto each of the first end surface 12*e* and the second end surface 12*f* of the laminate 12. In addition, the application amount of the conductive resin paste is able to be controlled by controlling the pushing amount of the end surface of the laminate 12 to the metal surface plate.

The number of times of pressing the first end surface 12*e* and the second end surface 12*f* of the laminate 12 against the transfer stage is not less than three times in each of the first end surface 12*e* and the second end surface 12*f,* and the manufacturing method preferably further includes a step of removing the conductive resin paste adhering to the transfer stage, by a squeegee each time the pressing is performed.

After the conductive resin paste is applied onto the first end surface 12*e* and the second end surface 12*f* of the laminate 12 formed with the underlying electrode layer, heat treatment is performed at a temperature of not less than about 80° C. and not more than about 280° C., for example, to thermoset the conductive resin, and thus, to form the first conductive resin layer 28*a* of the first external electrode 24*a* and the second conductive resin layer 28*b* of the second external electrode 24*b*.

Subsequently, the first plating layer 30*a* is formed to cover the first underlying electrode layer 26*a* and the first conductive resin layer 28*a*.

Similarly, the second plating layer 30*b* is formed to cover the second underlying electrode layer 26*b* and the second conductive resin layer 28*b*.

In the case where the first plating layer 30*a* and the second plating layer 30*b* are formed of a nickel plating layer, electrolytic plating, for example, is used as a method of forming the first plating layer 30*a* and the second plating layer 30*b*.

The first plating layer 30*a* and the second plating layer 30*b* may be formed of a plurality of layers. In the case where the first plating layer 30*a* and the second plating layer 30*b* are formed in a two-layer structure, a tin plating layer is preferably formed on a surface of each nickel plating layer, if necessary.

As described above, the multilayer ceramic capacitor 10 shown in FIG. 1 is manufactured.

With the method of manufacturing a multilayer ceramic capacitor according to the present preferred embodiment, in the step of applying the conductive resin paste onto the laminate, the end surface of the laminate 12 formed with the underlying electrode layer is pressed against the rubber surface plate 42 of the paste storage portion 40, and then the laminate 12 is pulled away, such that it is possible to apply the conductive resin paste so as to cover the underlying electrode layer except for the central portion of the underlying electrode layer, and to form a portion in which the conductive resin paste is not applied at the central portion of the underlying electrode layer.

Further, with the method of manufacturing a multilayer ceramic capacitor according to the present preferred embodiment, in addition to the step of applying the conductive resin paste onto the laminate, this method preferably further includes the step of pressing each of the first end surface 12*e* and the second end surface 12*f* of the laminate 12 onto which the conductive resin paste 44 is applied against the transfer stage provided on its bottom with a metal surface plate and controlling the amount of the conductive resin paste, such that it is possible to control the application amount of the conductive resin paste and, consequently, to control the exposure ratio of the underlying electrode layer.

Furthermore, with the method of manufacturing a multilayer ceramic capacitor according to the present preferred embodiment, in the step of controlling the amount of the conductive resin paste, the number of times of pressing each of the first end surface 12*e* and the second end surface 12*f* of the laminate 12 onto which the conductive resin paste 44 is applied is not less than three times, and this method includes the step of removing the conductive resin paste adhering to the transfer stage, by a squeegee each time the pressing is performed, such that it is possible to more finely control the application amount of the conductive resin paste and, thus, to precisely control the exposure ratio of the underlying electrode layer.

Next, with respect to the multilayer ceramic capacitor obtained by the above-described method, experiments for confirming the number of occurrences of cracks and experiments for measuring ESR were performed.

As a practical example, in accordance with the method of manufacturing a multilayer ceramic capacitor, which has been described above, samples of multilayer ceramic capacitors of Examples 1 to 9 having the specifications as described below were produced.

Each example is a multilayer ceramic capacitor having the following specifications.

Size of multilayer ceramic capacitor (design value): length×width×height=about 1.0 mm×about 0.5 mm×about 0.5 mm
Material of dielectric layer: BaTiO$_3$
Capacitance: about 10 µF
Rated voltage: about 6.3 V
Material of internal electrode: Ni
Structure of external electrode
Underlying Electrode Layer
Material of underlying electrode layer: electrode containing conductive metal (Cu) and glass
Thickness of underlying electrode layer (end surface central portion): about 5 µm
Exposure area of underlying electrode layer without conductive resin layer: see Table 1
Conductive Resin Layer
Metal: Ag
Resin: epoxy type
Thermosetting temperature: about 200° C.
Thickness of conductive resin layer: about 15 µm
Plating Layer
Plating layer: Two-layer structure of nickel plating layer and tin plating layer
Thickness of nickel plating layer: about 3 µm
Thickness of tin plating layer: about 5 µm In addition, the conditions of the method of manufacturing the multilayer ceramic capacitor of each example were as follows.

The conditions of the rubber surface plate 42 of the paste storage portion 40 used for producing the multilayer ceramic capacitor of each example were as follows.

Type of rubber used as rubber surface plate: fluoro rubber
Thickness of rubber surface plate: about 5 mm
Hardness of rubber surface plate: about A30 in Shore hardness In addition, when the multilayer ceramic capacitor of each example was produced, the operation of the laminate with respect to the rubber surface plate was set as follows.

Speed at which laminate is pulled up from paste storage portion provided with rubber surface plate: about 10 mm/s
Number of times of pressing first end surface and second end surface of laminate against rubber surface plate: see Table 1
Pushing amount of first end surface and second end surface of laminate to rubber surface plate: see Table 1

In Example 1, the number of times of pressing the first end surface and the second end surface of the laminate against the rubber surface plate was once, the pushing amount of the first end surface and the second end surface of the laminate to the rubber surface plate was about 10 µm, the number of times of pressing the first end surface and the second end surface of the laminate against the transfer stage was 0, and the application amount of the conductive resin paste was controlled. Consequently, the exposure ratio of a portion of the underlying electrode layer, which was not covered with the conductive resin layer, was about 3%, for example.

In Example 2, the number of times of pressing the first end surface and the second end surface of the laminate against the rubber surface plate was once, the pushing amount of the first end surface and the second end surface of the laminate to the rubber surface plate was about 20 µm, the number of times of pressing the first end surface and the second end surface of the laminate against the transfer stage was 0, and the application amount of the conductive resin paste was controlled. Consequently, the exposure ratio of a portion of the underlying electrode layer, which was not covered with the conductive resin layer, was about 5%, for example.

In Example 3, the number of times of pressing the first end surface and the second end surface of the laminate against the rubber surface plate was once, the pushing amount of the first end surface and the second end surface of the laminate to the rubber surface plate was about 30 µm, the number of times of pressing the first end surface and the second end surface of the laminate against the transfer stage was 0, and the application amount of the conductive resin paste was controlled. Consequently, the exposure ratio of a portion of the underlying electrode layer, which was not covered with the conductive resin layer, was about 15%, for example.

In Example 4, the number of times of pressing the first end surface and the second end surface of the laminate against the rubber surface plate was once, the pushing amount of the first end surface and the second end surface of the laminate to the rubber surface plate was about 50 µm, the number of times of pressing the first end surface and the second end surface of the laminate against the transfer stage was 0, and the application amount of the conductive resin paste was controlled. Consequently, the exposure ratio of a portion of the underlying electrode layer, which was not covered with the conductive resin layer, was about 30%, for example.

In Example 5, the number of times of pressing the first end surface and the second end surface of the laminate against the rubber surface plate was once, the pushing amount of the first end surface and the second end surface of the laminate to the rubber surface plate was about 50 µm, for example, the number of times of pressing the first end surface and the second end surface of the laminate against the transfer stage was three times, the pushing amount of the first end surface and the second end surface of the laminate to the transfer stage was about 50 µm, for example, and the application amount of the conductive resin paste was controlled. As for the order of pressing, the first end surface and the second end surface of the laminate were pressed against the transfer stage and then pressed against the rubber surface plate. Consequently, the exposure ratio of a portion of the underlying electrode layer, which was not covered with the conductive resin layer, was about 35%, for example.

In Example 6, the number of times of pressing the first end surface and the second end surface of the laminate against the rubber surface plate was once, the pushing amount of the first end surface and the second end surface of the laminate to the rubber surface plate was about 50 µm, for example, the number of times of pressing the first end surface and the second end surface of the laminate against the transfer stage was six times, the pushing amount of the first end surface and the second end surface of the laminate to the transfer stage was about 50 µm, for example, and the application amount of the conductive resin paste was controlled. As for the order of pressing, the first end surface and the second end surface of the laminate were pressed against the transfer stage and then pressed against the rubber surface plate. Consequently, the exposure ratio of a portion of the underlying electrode layer, which was not covered with the conductive resin layer, was about 38%, for example.

In Example 7, the number of times of pressing the first end surface and the second end surface of the laminate against the rubber surface plate was twice, the pushing amount of the first end surface and the second end surface of the laminate to the rubber surface plate was about 50 μm, for example, the number of times of pressing the first end surface and the second end surface of the laminate against the transfer stage was 0, and the application amount of the conductive resin paste was controlled. Consequently, the exposure ratio of a portion of the underlying electrode layer, which was not covered with the conductive resin layer, was about 75%, for example.

In Example 8, the number of times of pressing the first end surface and the second end surface of the laminate against the rubber surface plate was twice, the pushing amount of the first end surface and the second end surface of the laminate to the rubber surface plate was about 50 μm, for example, the number of times of pressing the first end surface and the second end surface of the laminate against the transfer stage was three times, the pushing amount of the first end surface and the second end surface of the laminate to the transfer stage was about 50 μm, for example, and the application amount of the conductive resin paste was controlled. As for the order of pressing, the first end surface and the second end surface of the laminate were pressed against the transfer stage and then pressed against the rubber surface plate. Consequently, the exposure ratio of a portion of the underlying electrode layer, which was not covered with the conductive resin layer, was about 79% for example.

In Example 9, the number of times of pressing the first end surface and the second end surface of the laminate against the rubber surface plate was twice, the pushing amount of the first end surface and the second end surface of the laminate to the rubber surface plate was about 50 μm, for example, the number of times of pressing the first end surface and the second end surface of the laminate against the transfer stage was six times, the pushing amount of the first end surface and the second end surface of the laminate to the transfer stage was about 50 μm, for example, and the application amount of the conductive resin paste was controlled. As for the order of pressing, the first end surface and the second end surface of the laminate were pressed against the transfer stage and then pressed against the rubber surface plate. Consequently, the exposure ratio of a portion of the underlying electrode layer, which was not covered with the conductive resin layer, was about 82% for example.

In Example 10, the number of times of pressing the first end surface and the second end surface of the laminate against the rubber surface plate was three times, the pushing amount of the first end surface and the second end surface of the laminate to the rubber surface plate was about 50 μm, for example, the number of times of pressing the first end surface and the second end surface of the laminate against the transfer stage was 0, and the application amount of the conductive resin paste was controlled. Consequently, the exposure ratio of a portion of the underlying electrode layer, which was not covered with the conductive resin layer, was about 90% for example.

In Example 11, the number of times of pressing the first end surface and the second end surface of the laminate against the rubber surface plate was three times, the pushing amount of the first end surface and the second end surface of the laminate to the rubber surface plate was about 50 μm, for example, the number of times of pressing the first end surface and the second end surface of the laminate against the transfer stage was three times, the pushing amount of the first end surface and the second end surface of the laminate to the transfer stage was about 50 μm, for example, and the application amount of the conductive resin paste was controlled. As for the order of pressing, the first end surface and the second end surface of the laminate were pressed against the transfer stage and then pressed against the rubber surface plate. Consequently, the exposure ratio of a portion of the underlying electrode layer, which was not covered with the conductive resin layer, was about 90% for example.

In addition, as comparative examples, samples of multilayer ceramic capacitors of Comparative Examples 1 and 2 having the specifications as described below were produced.

The multilayer ceramic capacitor in Comparative Example 1 is different from the multilayer ceramic capacitors according to the Examples and is a multilayer ceramic capacitor in which the conductive resin layer covers the entire underlying electrode layer in the external electrode. The other conditions were the same or substantially the same as in the Examples. In the step of applying the conductive resin layer in the multilayer ceramic capacitor in Comparative Example 1, a stainless steel surface plate was used, instead of a rubber surface plate, the first end surface and the second end surface of the laminate were pressed against the stainless steel surface plate, and the number of times of removing the conductive resin paste adhering to the stainless steel surface plate was once. Consequently, the exposure ratio of a portion of the underlying electrode layer, which was not covered with the conductive resin layer, was 0%.

The multilayer ceramic capacitor in Comparative Example 2 is different from the multilayer ceramic capacitors according to the Examples and is a multilayer ceramic capacitor in which a conductive resin layer is not formed in the external electrode, and a plating layer is formed on the underlying electrode layer at both end surfaces and side surfaces. That is, the exposure ratio of a portion of the underlying electrode layer, which was not covered with the conductive resin layer, was about 100% for example.

A multilayer ceramic capacitor as a sample was mounted on a substrate using solder paste.

However, in the sample on which a conductive resin paste was applied to form a conductive resin layer, the side on which the conductive resin paste was applied was defined as a mounting surface. The substrate was bent by a push rod having a diameter of about 5 μm, for example, from a substrate surface on which the multilayer ceramic capacitor was not mounted, and subjected to mechanical stress. At this time, holding time was set to about 5 seconds, and the substrate was bent for two types of bending amounts, that is, about 3 mm and about 5 mm, for example, assuming a more severe situation. After the substrate was bent, the multilayer ceramic capacitor was removed from the substrate and polished in the direction perpendicular to the substrate surface, and the presence or absence of occurrence of cracks in the multilayer ceramic capacitor as a sample was observed. Then, the number of samples with cracks was counted. Ten samples in which the bending amount of the substrate was about 3 mm and ten samples in which the bending amount of the substrate was about 5 mm were prepared for each of Examples 1 to 9 and Comparative Examples 1 and 2.

In the measurement of the ESR, before the measurement, the multilayer ceramic capacitor as a sample was heat-treated in an air atmosphere at about 150° C. for about 1 hour and then mounted on a measuring substrate. After 24±2 hours from the completion of the heat treatment, a measurement frequency 1 was set to about 1 MHz, and the ESR was measured using a network analyzer.

Ten samples were prepared for each of Examples 1 to 9 and Comparative Examples 1 and 2.

In this experimental example, for the underlying electrode layer, the exposure area of the portion not covered with the conductive resin layer at both end surfaces of the laminate was calculated as described below.

The calculation was performed by observing a polished cross section of the multilayer ceramic capacitor as a sample.

Specifically, 20 cross sections were observed at a pitch of about 30 μm, for example, in the width direction y of the multilayer ceramic capacitor such that an LT surface of the multilayer ceramic capacitor was exposed so as to be parallel to the length direction z of the multilayer ceramic capacitor. For the cross-section observation, observation was performed with a magnification of about 5000 times using a SEM. In each cross section, the length where a plating layer and the underlying electrode layer were in contact with each other (that is, the length of an exposure portion) and the length where the plating layer and the conductive resin layer were in contact with each other were measured, and the exposure area of the underlying electrode layer with respect to each cross section was calculated from the length where the plating layer and the underlying electrode layer were in contact with each other (that is, the length of the exposure portion)×a pitch width. Finally, a value obtained by adding all values of the exposure areas calculated in the respective cross sections was taken as the exposure area of the underlying electrode layer in each sample.

Table 1 shows the results of the number of occurrences of cracks and the measurement results of the ESR for each of examples and comparative examples.

First, in the multilayer ceramic capacitors of Examples 1 to 11, the underlying electrode layer includes, on the first end surface and the second end surface of the laminate, the portion not covered with the conductive resin layer. Therefore, a portion of the underlying electrode layer is not covered with the high resistance conductive resin layer, and the extent to which the conductive resin layer covers the underlying electrode layer is reduced, so that it was confirmed that the ESR could be reduced when an average value of the ESR of the multilayer ceramic capacitors of Examples 1 to 11 was compared with an average value of the ESR of the multilayer ceramic capacitor of Comparative Example 1 in which the entire underlying electrode layer was covered with the conductive resin layer.

In the multilayer ceramic capacitors of Examples 2 to 11, since the ratio of the portion of the underlying electrode layer on the first end surface and the second end surface, which was not covered with the conductive resin layer, was not less than about 5%, for example, the extent to which the underlying electrode layer was covered with the high resistance conductive resin layer could be reduced, and each covering ratio could be optimized, so that the effect of further reducing the ESR could be obtained. More specifically, when an average value of the ESR of the multilayer ceramic capacitors of Examples 2 to 11 was compared with

TABLE 1

| | | Comparative Example 1 | Example 1 | Example 2 | Example 3 | Example 4 | Example 5 | Example 6 | Example 7 | Example 8 | Example 9 | Example 10 | Example 11 | Comparative Example 2 |
|---|---|---|---|---|---|---|---|---|---|---|---|---|---|---|
| Number of times of pressing against transfer stage | | 1 | 0 | 0 | 0 | 0 | 3 | 6 | 0 | 3 | 6 | 0 | 3 | No resin electrode |
| Pushing amount to transfer stage | | 50 μm | — | — | — | — | 50 μm | 50 μm | — | 50 μm | 50 μm | — | 50 μm | |
| Number of times of pressing against rubber surface plate | | 0 | 1 | 1 | 1 | 1 | 1 | 1 | 2 | 2 | 2 | 3 | 3 | |
| Pushing amount to rubber surface plate | | — | 10 μm | 20 μm | 30 μm | 50 μm | 50 μm | 50 μm | 50 μm | 50 μm | 50 μm | 50 μm | 50 μm | |
| Exposure ratio of underlying electrode layer | | 0% | 3% | 5% | 15% | 30% | 35% | 38% | 75% | 79% | 82% | 90% | 90% | 100% |
| Substrate bending resistance (Number of occurrence of NG) | Bending amount: 3 mm | 0/10 | 0/10 | 0/10 | 0/10 | 0/10 | 0/10 | 0/10 | 0/10 | 0/10 | 0/10 | 0/10 | 0/10 | 6/10 |
| | Bending amount: 5 mm | 0/10 | 0/10 | 0/10 | 0/10 | 0/10 | 0/10 | 0/10 | 0/10 | 0/10 | 0/10 | 4/10 | 3/10 | 10/10 |
| ESR (mΩ) | Sample number 1 | 23.61 | 9.61 | 8.69 | 7.72 | 9.02 | 7.73 | 5.44 | 6.10 | 5.81 | 6.75 | 6.20 | 5.97 | 4.57 |
| | 2 | 20.23 | 10.81 | 8.93 | 9.07 | 9.10 | 6.88 | 5.51 | 7.31 | 4.13 | 4.66 | 4.77 | 5.22 | 5.34 |
| | 3 | 27.19 | 10.70 | 8.80 | 10.53 | 8.85 | 6.02 | 7.75 | 5.67 | 5.72 | 5.75 | 5.40 | 5.20 | 4.94 |
| | 4 | 16.69 | 19.34 | 10.40 | 7.93 | 6.45 | 5.76 | 6.49 | 5.67 | 6.06 | 6.04 | 6.29 | 5.19 | 5.02 |
| | 5 | 21.56 | 9.25 | 8.52 | 8.06 | 5.57 | 6.63 | 5.69 | 6.19 | 6.27 | 6.44 | 5.07 | 5.68 | 6.64 |
| | 6 | 22.03 | 8.99 | 10.76 | 9.84 | 7.06 | 6.66 | 5.71 | 5.39 | 6.01 | 6.39 | 5.16 | 5.83 | 4.39 |
| | 7 | 18.34 | 12.22 | 9.64 | 7.47 | 5.40 | 6.40 | 5.72 | 5.71 | 6.76 | 5.03 | 6.28 | 4.46 | 3.79 |
| | 8 | 19.20 | 10.44 | 8.08 | 7.14 | 7.19 | 6.68 | 6.80 | 4.63 | 4.75 | 5.29 | 5.13 | 5.41 | 5.61 |
| | 9 | 23.44 | 8.73 | 10.42 | 9.22 | 5.82 | 5.71 | 5.17 | 6.91 | 3.78 | 4.41 | 6.41 | 6.12 | 5.08 |
| | 10 | 24.78 | 18.17 | 8.72 | 9.66 | 5.47 | 5.44 | 7.78 | 5.98 | 4.85 | 5.08 | 5.15 | 5.72 | 4.64 |
| | Average value | 21.71 | 11.83 | 9.30 | 8.66 | 6.99 | 6.39 | 6.21 | 5.96 | 5.41 | 5.58 | 5.59 | 5.48 | 5.00 |
| | Maximum value | 27.19 | 19.34 | 10.76 | 10.53 | 9.10 | 7.73 | 7.78 | 7.31 | 6.76 | 6.75 | 6.41 | 6.12 | 6.64 |
| | Minimum value | 16.69 | 8.73 | 8.08 | 7.14 | 5.40 | 5.44 | 5.17 | 4.63 | 3.78 | 4.41 | 4.77 | 4.46 | 3.79 |
| | Standard deviation | 3.18 | 3.80 | 0.94 | 1.15 | 1.51 | 0.68 | 0.95 | 0.75 | 0.98 | 0.81 | 0.63 | 0.49 | 0.77 | an average value of the ESR of the multilayer ceramic capacitor of Comparative Example 2 in which the conductive resin layer was not provided, an increase rate of the ESR was reduced to twice or less. In addition, in the multilayer ceramic capacitors of Examples 2 to 11, from the result obtained when the bending amount of the substrate was about 3 mm, for example, it was confirmed that durability was improved when substrate distortion was caused by the multilayer ceramic capacitor of Comparative Example 2.

In the multilayer ceramic capacitors of Examples 4 to 11, since the ratio of the portion of the underlying electrode layer on the first end surface and the second end surface, which was not covered with the conductive resin layer, was not less than about 30%, for example, the extent to which the underlying electrode layer was covered with the high resistance conductive resin layer could be reduced, and each covering ratio could be optimized, so that the effect of further reducing the ESR could be obtained. More specifically, when an average value of the ESR of the multilayer ceramic capacitors of Examples 4 to 11 was compared with an average value of the ESR of the multilayer ceramic capacitor of Comparative Example 2 in which the conductive resin layer was not provided, an increase rate of the ESR was reduced to about +50% or less, for example. In addition, in the multilayer ceramic capacitors of Examples 4 to 10, from the result obtained when the bending amount of the substrate was about 3 mm, for example, it was confirmed that durability was improved when substrate distortion was caused by the multilayer ceramic capacitor of Comparative Example 2.

In the multilayer ceramic capacitors of Examples 4 to 9, since the ratio of the portion of the underlying electrode layer on the first end surface and the second end surface, which was not covered with the conductive resin layer, was not less than 30%, for example, and not more than about 82%, for example, the extent to which the underlying electrode layer was covered with the high resistance conductive resin layer could be reduced, and each covering ratio could be optimized, so that it was possible to obtain the effect of further reducing the ESR and, in addition, maintain the crack reducing or prevent effect due to the conductive resin layer. More specifically, when an average value of the ESR of the multilayer ceramic capacitors of Examples 4 to 9 was compared with an average value of the ESR of the multilayer ceramic capacitor of Comparative Example 2 in which the conductive resin layer was not formed, an increase rate of the ESR was reduced to about +50% or less, for example. In addition, in the multilayer ceramic capacitors of Examples 4 to 9, from the result obtained when the bending amount of the substrate was about 5 mm, for example, it was confirmed that the number of occurrences of cracks was 0, and the multilayer ceramic capacitors had durability against high substrate distortion.

On the other hand, in the multilayer ceramic capacitors of Examples 10 and 11, since the ratio of the portion of the underlying electrode layer on the first end surface and the second end surface, which was not covered with the conductive resin layer, was about 90%, for example, the area covered with the conductive resin layer was small. Therefore, in the experiment confirming the occurrence of cracks, when the bending amount of the substrate was set to about 5 mm, for example, four cracks occurred in Example 10 and three cracks occurred in Example 11.

In Comparative Example 1, a relatively high ESR was obtained since the entire underlying electrode layer was covered with the conductive resin layer. In Comparative Example 2, since the conductive resin layer was not provided in the external electrode, when the bending amount of the substrate was about 3 mm, six cracks occurred, and when the bending amount of the substrate was about 5 mm, for example, cracks occurred in all ten samples.

The present invention is not limited to the above preferred embodiments, and may be modified in various ways without departing from the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a laminate including a plurality of dielectric layers, a first main surface and a second main surface facing each other and stacked in a stacking direction, a first side surface and a second side surface facing each other in a width direction orthogonal or substantially orthogonal to the stacking direction, and a first end surface and a second end surface facing each other in a length direction orthogonal or substantially orthogonal to the stacking direction and the width direction;
   a first internal electrode exposed from the first end surface and a second internal electrode exposed from the second end surface, the first internal electrode and the second internal electrode being alternately stacked with one of the dielectric layers interposed therebetween;
   a first external electrode connected to the first internal electrode and disposed on a surface of the first end surface, portions of surfaces of the first main surface and the second main surface, and portions of surfaces of the first side surface and the second side surface; and
   a second external electrode connected to the second internal electrode and disposed on a surface of the second end surface, portions of the surfaces of the first main surface and the second main surface, and portions of the surfaces of the first side surface and the second side surface; wherein
   the first external electrode includes:
      a first underlying electrode layer including conductive metal and a glass component;
      a first conductive resin layer disposed on a surface of the first underlying electrode layer and including a thermosetting resin and metal; and
      a first plating layer disposed on a surface of the first conductive resin layer;
   the second external electrode includes:
      a second underlying electrode layer including conductive metal and a glass component;
      a second conductive resin layer disposed on a surface of the second underlying electrode layer and including a thermosetting resin and metal; and
      a second plating layer disposed on a surface of the second conductive resin layer;
   the first underlying electrode layer includes on the first end surface a portion not covered with the first conductive resin layer;
   the first plating layer is disposed on a surface of the portion of the first underlying electrode layer, which is not covered with the first conductive resin layer;
   the second underlying electrode layer includes on the second end surface a portion not covered with the second conductive resin layer;

the second plating layer is disposed on a surface of the portion of the second underlying electrode layer, which is not covered with the second conductive resin layer;

each of the first and second conductive resin layers is in direct contact with the laminate on one or more of the first and second main surfaces and the first and second side surfaces of the laminate;

a front end portion of the first conductive resin layer disposed on the first underlying electrode layer on the first and second main surfaces and the first and second side surfaces overlaps within a range of not less than about 10 µm in a direction of the second end surface from a front end portion of the first underlying electrode layer to be disposed on the surface of the laminate; and a front end portion of the second conductive resin layer disposed on the second underlying electrode layer on the first and second main surfaces and the first and second side surfaces overlaps within a range of not less than about 10 µm in a direction of the first end surface from a front end portion of the second underlying electrode layer to be disposed on the surface of the laminate.

2. The multilayer ceramic capacitor according to claim 1, wherein the first conductive resin layer is provided on a surface of the first underlying electrode layer located on a ridge line portion and a corner portion defined by each intersection of the first end surface, the first main surface, the second main surface, the first side surface and the second side surface of the laminate; and the second conductive resin layer is provided on a surface of the second underlying electrode layer located on a ridge line portion and a corner portion defined by each intersection of the second end surface, the first main surface, the second main surface, the first side surface and the second side surface of the laminate.

3. The multilayer ceramic capacitor according to claim 1, wherein an exposure ratio of the portion of the first underlying electrode layer on the first end surface, which is not covered with the first conductive resin layer, and an exposure ratio of the portion of the second underlying electrode layer on the second end surface, which is not covered with the second conductive resin layer, are not less than about 5%.

4. The multilayer ceramic capacitor according to claim 1, wherein an exposure ratio of the portion of the first underlying electrode layer on the first end surface, which is not covered with the first conductive resin layer, and an exposure ratio of the portion of the second underlying electrode layer on the second end surface, which is not covered with the second conductive resin layer, are not less than about 30%.

5. The multilayer ceramic capacitor according to claim 1, wherein an exposure ratio of the portion of the first underlying electrode layer on the first end surface, which is not covered with the first conductive resin layer, and an exposure ratio of the portion of the second underlying electrode layer on the second end surface, which is not covered with the second conductive resin layer, are not less than about 30% and not more than about 82%.

6. The multilayer ceramic capacitor according to claim 1, wherein the first underlying electrode layer disposed on the surface of the first end surface has a thickness at a central portion of the first end surface that is larger than a thickness of other portions of the first underlying electrode layer; and the second underlying electrode layer disposed on the surface of the second end surface has a thickness at a central portion of the second end surface is larger than a thickness of other portions of the second underlying electrode layer.

7. The multilayer ceramic capacitor according to claim 1, wherein a shape of each of the portion of the first underlying electrode layer not covered with the first conductive resin layer and the portion of the second underlying electrode layer not covered with the second conductive resin layer is circular, substantially circular, elliptical, or substantially elliptical.

8. The multilayer ceramic capacitor according to claim 1, wherein the conductive metal of the first and second underlying electrode layers includes at least one selected from Cu, Ni, Ag, Pd, Ag—Pd alloy, and Au, and the glass of the first and second underlying electrode layers includes at least one selected from B, Si, Ba, Mg, Al, and Li.

9. The multilayer ceramic capacitor according to claim 1, wherein a thickness of each of the first and second conductive resin layers is not less than about 0.5 µm and not more than about 20 µm.

* * * * *